Oct. 4, 1938.　　　N. C. HUNT ET AL　　　2,132,030

HIGH PRESSURE VALVE

Filed March 17, 1936　　　3 Sheets-Sheet 1

Inventor
Nathan C. Hunt and
Samuel C. Chessman
By Frease and Bishop
Attorneys

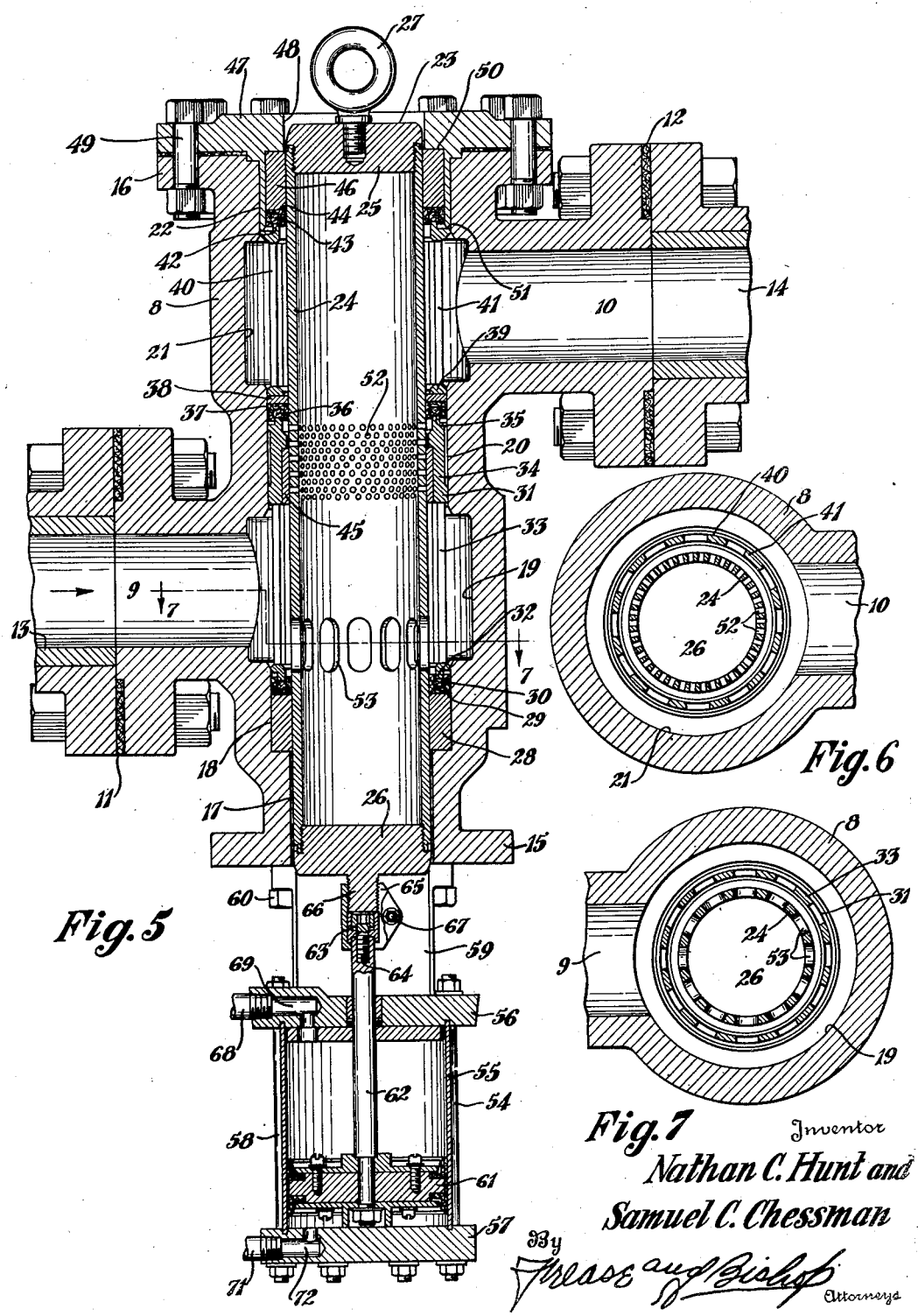

Patented Oct. 4, 1938

2,132,030

UNITED STATES PATENT OFFICE 2,132,030

HIGH PRESSURE VALVE

Nathan C. Hunt and Samuel C. Chessman, Salem, Ohio; said Chessman assignor to said Hunt Application March 17, 1936, Serial No. 69,311

11 Claims. (Cl. 251—76)

The invention relates to valves for pressure lines utilized in transmitting air, water, oil, gases or other fluids under pressure; and more particularly to valves for high presure hydraulic lines or systems.

Such high pressure hydraulic lines include among others, lines used in connection with rolling mills for rolling various metals, particularly continuous mills, as well as lines used in connection with the operation of hydraulic presses and machinery.

Many different types of valves have been used for these purposes, but many difficulties arise in connection with the manufacture, operation or use of prior types of valves.

Large hydraulic valves for handling large quantities of water at high pressures necessarily require heavy steel castings for the valve body in order to obtain the required strength and to provide the proper flange connectors for the inlet and outlet pipes. Although a sleeve type valve such as shown in the Nathan C. Hunt, Valve Patent No. 2,071,204, dated February 16, 1937, might otherwise be satisfactory as a high presure valve, the sleeve and valve body thereof would have to be so large and bulky for high pressure hydraulic use that the cost thereof would probably be prohibitive, and almost insurmountable mechanical difficulties might be involved in the manufacture of the same.

Another consideration of extreme importance in the use of a high pressure hydraulic valve is the necessity for providing for ready access to the packings and ports of such a valve for inspection and repair purposes.

Moreover, the water utilized in immense quantities in high pressure hydraulic systems frequently contains particles of grit, dirt, sand, metal particles and the like, which may quickly play havoc with and wreck the packings and ports in hydraulic valves if the same lodges at or adjacent to the ports or packings, or particularly when the velocity of the water through the valve ports or past the valve packings is high, as at the instant just before the hydraulic valve becomes fully closed, or at the instant after a hydraulic valve has commenced to open.

An accumulation of metallic particles in a hydraulic system frequently occurs, when the pipe sections and fittings therefor are secured together by welded joints; and it is sometimes difficult if not impossible to rid such a system from particles of metal which may damage the ordinary valve.

Moreover, a further important problem in high pressure hydraulic line valve construction is to provide for the proper rate of closing a hydraulic valve slow enough that the flow is properly retarded, so that the increased velocity and pressure built up in and through the valve does not damage the valve or the hydraulic line in which the valve is connected, as the valve is being closed. Accordingly, it is usually always desired to provide for opening a high pressure hydraulic valve much faster than it is closed.

It is therefore a prime object of the present invention to provide a high pressure hydraulic valve avoiding the difficulties and solving the problems just enumerated.

It is a further object of the present invention to provide an improved valve which may be used as a high pressure hydraulic valve without having any inordinately large or bulky parts.

Likewise, it is an object of the present invention to provide a high pressure hydraulic valve which is relatively simple in construction so that it may be easily manufactured from the desired materials at a reasonable cost.

Moreover, an object of the present invention is to provide a high pressure hydraulic valve in the use of which grit, dirt, sand, metal particles and the like which may be contained in the water or other fluid passing through the valve, cannot damage the valve ports or packings, either when the flow is at high velocity or when such foreign matter may become lodged somewhere within the valve.

Also an object of the present invention is to provide a high pressure hydraulic valve so constructed and arranged that the valve ports and packings are easily accessible for ready and prompt inspection and repair.

Another object of the present invention is to provide a high pressure hydraulic valve in which the packings for the valve members are directly acted upon by the line pressure, to pressure seat the packings against the valve members being sealed thereby.

A further object of the present invention is to provide a high pressure hydraulic valve with means for opening and closing the same, in which the rates of opening and closing may be different and in which the rates of opening or closing may be infinitely varied or adjusted at will.

And finally, it is an object of the present invention to provide a valve construction capable of attaining all of the foregoing desiderata, and which is very efficient in use.

These and other objects may be attained by a valve construction, a preferred embodiment of which is shown in the drawings and hereinafter described in detail and claimed, and which may be stated in general terms as preferably including walls forming a tubular valve body open from end to end, separated channels within the valve body, an inlet passage communicating with one of the channels, an outlet passage communicating with the other channel, a U-shaped center packing ring in the valve body between the channels, a U-shaped packing ring in the valve body beyond each channel, bushing members in said valve body, means for positioning and clamping said packings and bushings in said valve body, a hollow double-ended piston-like plunger member removably located in said valve body and slidably mounted in said bushings, said packing rings sealing between the valve body and plunger member, two series of ports spaced from each other formed in said plunger member for establishing communication through said plunger member between the channels when the valve is in "on" position, means protecting the center packing from the direct flow of fluid between said channels; and means for operating said plunger member including a double acting piston, pressure connections therefor, and means for varying the rate at which said double acting piston moves in each direction.

In the drawings,

Fig. 5 is a view similar to Fig. 4 showing the valve in "off" position;

Fig. 6 is a section taken on the line 6—6, Fig. 4; and

Fig. 7 is a section taken on the line 7—7, Fig. 5.

Similar numerals refer to similar parts throughout the various figures of the drawings.

Figure 1:
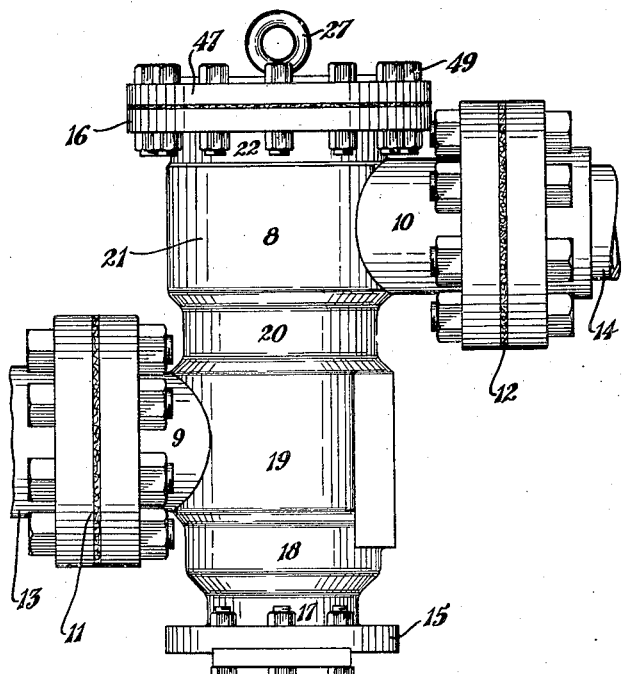
Figure 1 is a side elevation of an improved high pressure hydraulic valve and operating means therefor, the control valve for the operating means being shown somewhat diagrammatically and partly in section.
Figure 2:
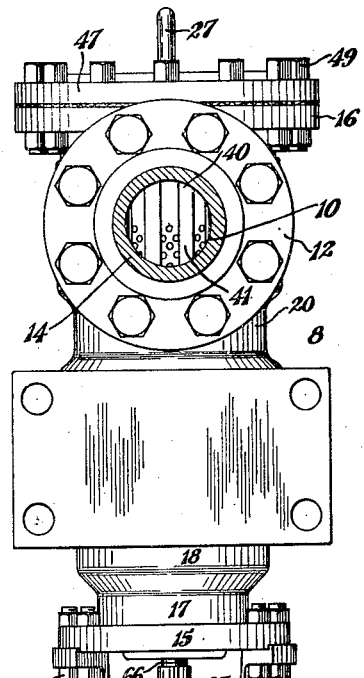
Fig. 2 is an end elevation of the improved high pressure hydraulic valve shown in Fig. 1, together with part of the operating means therefor.
Figure 3:
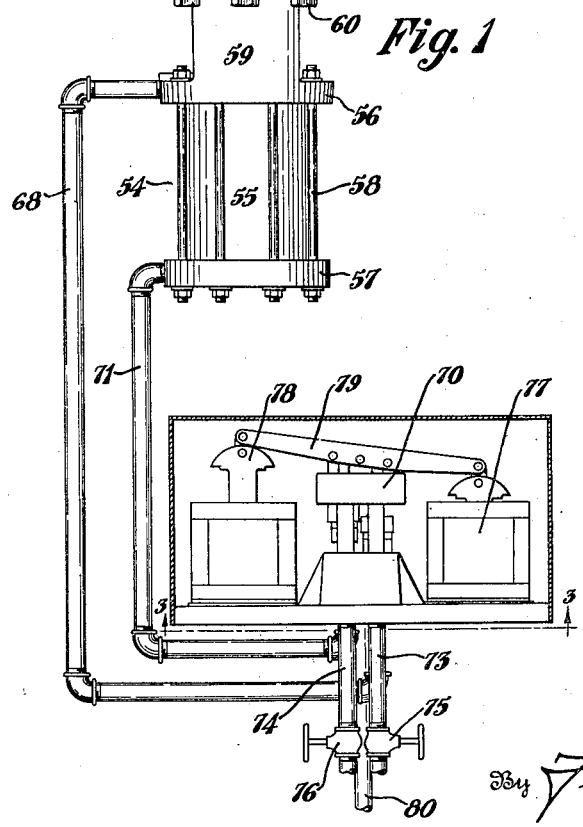
Fig. 3 is a bottom plan view looking in the direction of the arrows 3—3, Fig. 1, showing the piping connections for the control valve for the main valve operating means.
Figure 3:
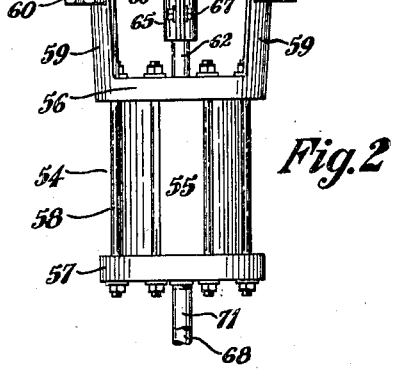
Figure 3:
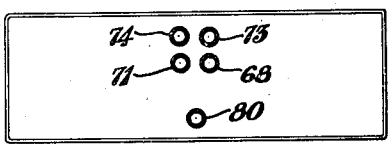

A high pressure hydraulic valve embodying the present improvements is shown in the drawings and may include walls forming a tubular valve body generally indicated at 8 provided with an inlet opening 9 and an outlet opening 10; and the inlet and outlet openings 9 and 10 may have flanged sealed connections 11 and 12, respectively, with a hydraulic pressure conduit 13 and a conduit 14 leading to a hydraulically operated device.

The tubular valve body 8 is preferably open from end to end and is likewise preferably open at both ends; and its internal configuration is preferably such that from the inlet end flange 15 to the outlet end flange 16 there is formed a tubular preferably circumferential passageway 17, an enlarged annular recess 18, a further enlarged annular inlet channel 19 communicating with the inlet opening 9 to form what is generally termed herein an inlet passage, a restricted annular neck 20, an enlarged annular outlet channel 21 communicating with the outlet opening 10 to form what is generally termed herein an outlet passage, and a restricted annular entering throat 22. The inlet and outlet passages thus formed in the valve body walls are accordingly spaced apart by the restricted annular neck 20.

A hollow plunger member generally indicated at 23 is slidably and removably mounted within the valve body 8; and the plunger member 23 may comprise a tubular member 24 closed at its upper or outlet end by a cap 25 threaded thereinto, and closed at its lower or inlet end by a cap 26 threaded into the lower end of the tubular member 24.

The cap 25 may preferably be provided with an eye 27 for aiding in removing the plunger, as will be hereinafter described.

An annular bushing ring 28 is disposed within the annular recess 18 for slidably mounting the plunger tube 24, and a flexible channel-shaped or U-shaped packing ring 29 is likewise located in said annular recess 18 abutting said bushing 28 and interposed between the valve body 8 and plunger tube 24 with its open side directed toward the inlet channel 19 so as to prevent the escape of fluid pressure between the tubular plunger 24 and the inlet end 15 of the valve body because of the location of the packing ring 29 between the inlet passage and the lower or inlet valve body end.

Preferably a flax packing ring 30 is provided between the annular flanges of the channel-shaped packing ring 29, and the purpose of the flax packing which has a relatively great capacity for absorbing water will be hereinafter described.

Preferably a rigid annular spacing spider, generally indicated at 31, is provided with its end flange portion 32 abutting and holding the flax packing 30 in a preloaded or compressed condition in the packing 29, and with its latticed or perforate portion 33 spanning the inlet channel 19. The spacing spider 31 is likewise provided with a solid portion 34 disposed within the annular neck 20 and terminating in an end flange portion 35 which abuts and holds a flax packing 36 in a preloaded or compressed condition between the annular flanges of a channel-shaped or U-shaped, flexible, preferably leather packing ring 37.

The flax packing 36 and channel packing ring 37 are similar to the packings 30 and 29 respectively, but are located within the restricted annular neck 20 between the inlet and outlet passages with the open side of the channelled ring 37 directed toward the inlet channel 19 so as to always be subject to fluid pressure in the inlet passage. The annular flanges of the packing ring 37 abut the valve body wall and plunger tube 24 so as to prevent the escape of pressure from the inlet passage to the outlet passage between the valve body and the plunger tube.

A preferably hardened steel ring 38, the purpose of which will be hereinafter described, is preferably disposed within the neck 20 between the packing ring 37 and the outlet channel 21 against which the lower end 39 of a second annular spacing spider, generally indicated at 40, abuts. The spacing spider 40 has its latticed portion 41 spanning the outlet channel 21 and is provided at its upper end with an end flange 42, which abuts the flax packing ring 43 similar to the flax packings 36 and 30, which is interposed between the annular flanges of a U-shaped or channel-shaped flexible, preferably leather packing ring 44, similar to the packing rings 37 and 29.

The packing ring 44 is disposed generally within the entering throat 22 of the valve body 8 and has its open side directed toward the outlet channel 21 so as to prevent the escape of pressure at the outlet end of the valve body.

An elongated annular or tubular bushing-like protecting or shielding member 45 is held within the portion 34 of the spreader 31, for a purpose which will be hereinafter described; and a bushing member 46 generally similar to the bushing member 28, in which the plunger tube 24 is likewise slidably mounted, abuts the upper end of the packing ring 44 and is located generally within the entering throat 22.

A housing or body cap member 47 having a central opening 48 similar in size to the passageway 17, is preferably secured by a bolted connection 49 to the valve body end flange 16. The housing cap is provided with an annular shoulder 50, which abuts the bushing 46 to position, locate and clamp the same and the packing ring 44 and flax packing 43 with respect to the spreader 40. The housing cap 47 is likewise provided with a second annular shoulder 51, which directly abuts the upper end of the spreader 40 to locate, position and clamp the spreaders 40 and 31, the ring 38, the packing rings 37 and 29, the flax packings 36 and 30, the bushing 28 and the protecting ring 45 held by the spreader 31 within the valve body 8. Thus, pressure thrust on packing ring 44 is transmitted directly to shoulder 50 and pressure thrust on packing ring 37 is transmitted directly to shoulder 51; so that neither of said packing rings 37 and 44 is subjected to pressure thrust from the other packing ring.

Figure 4:
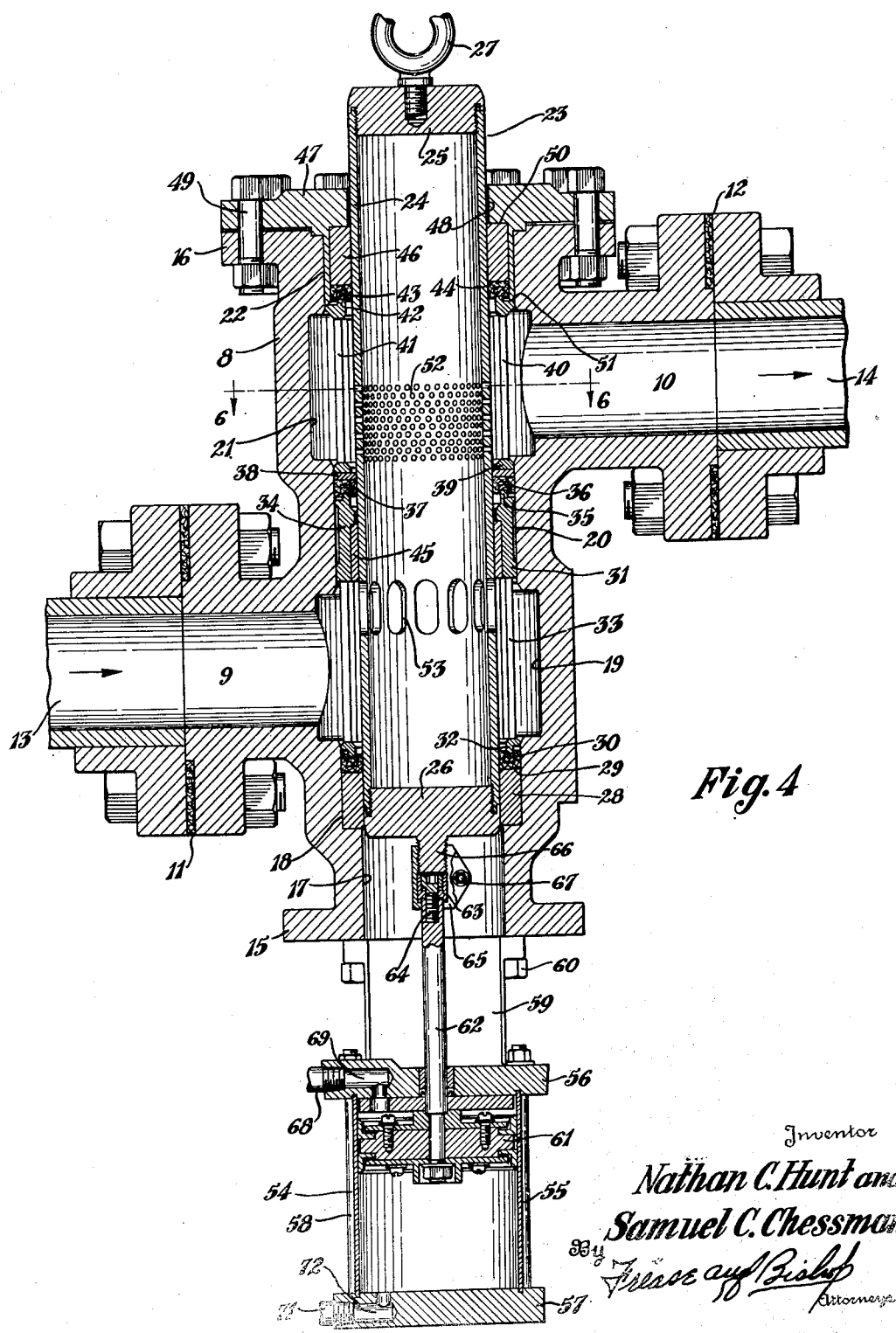
Fig. 4 is an enlarged longitudinal elevation section of the improved high pressure hydraulic valve shown in Fig. 1, showing the valve in "on" position.

Referring to Fig. 4, wherein the valve is shown in "open" or "on" position, the plunger tube 24 is provided with a multiple series of relatively small ports or openings 52 located opposite the outlet channel 21 when the plunger is in the position shown in Fig. 4, and a second single series of relatively large openings or ports 53 spaced from the first series of ports 52 and always (Figs. 4 and 5) located opposite to or in communication with the inlet channel 19. The ports 52 and 53 thus establish communication through the hollow plunger 23 between the inlet and outlet channels 19 and 21 when the valve is in the "on" position shown in Fig. 4. The outer peripheral edges of the ports 52 are rounded or curved in order to remove sharp edges which would cut into and destroy the leather packing ring 37 as the plunger tube slides to and fro within the valve body from "on" to "off" position.

The plunger 23 is moved from the "open" or "on" position of Fig. 4 to the "closed" or "off" position of Fig. 5, and vice versa, by operating means generally indicated at 54, which may include a cylinder 55, to which an upper cylinder head 56 and a lower cylinder head 57 may be secured by tie rods 58; and the upper cylinder head 56 is preferably provided with integral brackets 59, which may be secured to the lower valve body end flange 15 by bolts 60. A usual double acting piston 61 may be operatively mounted within the cylinder 55 and a piston rod 62 may project through the upper cylinder head 56. The outer end of the piston rod 62 preferably has an enlarged head 63 secured thereto by a screw 64; and a split ring clamping collar 65 may preferably engage the head 63 and threadably engage a threaded lug 66 projecting from the inlet end cap 26 of the plunger member 23. When the split ring member 65 is in the position shown in Figs. 4 and 5, the clamping screw 67 holds the piston rod 62 securely to the plunger lug 66.

If it is desired to at any time remove the plunger 23 from within the valve body for inspecting or repairing the bushings or packings, it is only necessary to loosen the screw 67, and then unscrew the clamping collar 65 so as to disengage the threaded lug 66 whereupon the plunger 23 may be slidably removed from the valve body by pulling on the eye bolt 27.

Referring particularly to Fig. 1, a conduit 68 leads from ports 69 in the upper cylinder head 56 to the pilot valve generally indicated at 70; and another conduit 71 leads from ports 72 in the lower cylinder head 57 to the pilot valve 70.

A source of fluid pressure communicates through the conduit 80 with the pilot valve 70 to furnish the pressure for operating the double acting piston 61; and two separate or independent exhaust conduits 73 and 74 are provided leading from the pilot valve 70, respectively, for each cylinder head 56 and 57. Separate throttle valves 75 and 76 are provided respectively for each exhaust conduit 73 and 74. The pilot valve may be and preferably is operated by two solenoids 77 and 78 both connected with a lever 79, which in turn is connected with the pilot valve 70.

The detailed construction of the pilot valve 70 has not been shown herein because any valve, hand or otherwise operated, which is so constructed and arranged by manifolding and the like, that when moved to one position, a source of pressure communicates with one of the cylinder heads 56 or 57 and the other cylinder head communicates with one of the exhaust passages 73 or 74, and when moved to the other position, the source of pressure communicates with the other cylinder head and the first named cylinder head communicates with the other exhaust passage, will accomplish the objects of the present invention. The principal feature of the operating means for the main valve is the provision of a separate exhaust for each cylinder head, which may be independently controlled so that the rate of moving the main plunger 23 in each direction may be independently varied; because it is usually desired in a hydraulic valve to open the same faster than it is closed.

The plunger cylinder member 24 is preferably made of a tough hard metal so that there will be no appreciable wear between the same and the parts across which it slides. Likewise, the ring 38 is a hardened steel ring because as the valve is closed, the ports 52 first pass across and are cut off by the ring 38. The increasing of the velocity of the fluid passing through the ports 52 at cut off subjects any contacting surface to an abrasive, gouging or scarfing action. The ring 38 and plunger cylinder 34 both being made of hard wear-resistant material, withstand the scarfing action of the fluid at high velocity during the closing of the valve because the steel ring 38 actually effects the closing or opening of the ports 52 as the ports pass across the ring.

When the plunger 23 is moved from "open" to "closed" position, the ports 52 first pass across or traverse the steel ring 38, then pass across or traverse the pressure sealed packing ring 37, and are finally located on the inlet side of the packing ring 37 substantially under the bushing 45 and are closed by the same.

Thus, the bushing 45 protects all ports that traverse the packing ring 37 from fluid flow in a direction from the exterior to the interior of the plunger 23. Moreover, in the embodiment shown, only one packing ring is traversed by ports and then only by one series of ports; so that all ports that traverse a packing ring are protected from fluid flow in a direction from the exterior to the interior of the plunger 23. Thus, these ports which traverse packings are prevented from accumulating foreign material that would damage the packing traversed thereby.

Referring to Fig. 1, the pilot valve parts are shown in the position which they are normally in when the main valve is in the "off" position shown in Fig. 5, with pressure on the upper side of the piston 61 in cylinder head 56. For opening the main valve, the plunger 23 must be raised to the position shown in Fig. 4 and this is accomplished by energizing solenoid 78 momentarily to lower the armature thereof, causing the relative positions of the solenoids 77 and 78 shown in Fig. 1 to be reversed. The parts of the pilot valve 70 are thereby so arranged that pressure from conduit 80 communicates through the pilot valve and conduit 71 to the lower cylinder head 57, raising the piston 61 and the plunger 23 thereby. As the piston 61 raises, cylinder head 56 exhausts through conduit 68, through the pilot valve 70, the exhaust conduit 73 and throttle valve 75. By adjusting the throttle valve 75, the rate at which the piston 61 moves upward, and therefore the rate of upward movement of the plunger 23, may be varied, thus controlling the rate of opening of the main valve.

When it is desired to close the main valve from the open position of Fig. 4, the plunger 23 must be lowered and this is accomplished by momentarily energizing solenoid 77, which actuates the pilot valve to the position shown in Fig. 1, when pressure from line 80 communicates through the pilot valve 70 and conduit 68 with the upper cylinder head 56 to lower the piston 61; and at the same time, cylinder head 57 communicates through conduit 71, and pilot valve 70 to exhaust conduit 74 and throttle valve 76. By varying the opening in the throttle valve 76, the rate at which the piston 61 moves downward and therefore the rate of downward movement of the plunger 23, is varied, thus controlling the rate of closing of the main valve.

The channel-shaped packing rings 29 and 37 are always subject to the line pressure in the inlet passage because the spreader 31 does not fit tightly in the valve body. The fluid pressure in the conduit 13 therefor acts upon the legs of the channelled rings 29 and 37 to spread the same and maintain a perfect seal between the valve body and plunger tube 24. As the pressure in the line increases, the sealing effectiveness of the packing rings 29 and 37 also increases, thereby positively preventing any pressure leakage past the sealing rings 29 and 37.

The same pressure sealing action is accomplished by the packing ring 44 whenever there is any fluid pressure in the outlet passageway.

The flax packings 30, 36 and 43 within their respective sealing rings, are of course preloaded when assembled and clamped by the part 47; and their capacity for absorbing water tends to expand the same and create an additional force tending to spread the annular flange portions of the packing rings apart and urge them into sealing abutment with the valve body and plunger tube.

The protecting bushing 45 with the spreader portion 34, and steel ring 38 on each side of the center packing ring 37 prevent direct fluid flow from the inlet passage through ports 52 from the outside to the inside of the plunger 23 and prevent direct fluid flow from the inlet passage from ever reaching the packing ring 37, although the protecting ring 45 does not prevent pressure seepage to the packing ring 37. Thus, there is never any fluid flow directly past packing 37 and into any of the ports 52, which might cause dirt, grit or other foreign matter to become lodged between packing ring 37 and the outer edges of the ports 52, which would cause a scarfing and ultimately a destructive action on the packing 37.

On the other hand, fluid flow is always through the ports 52 outward from the interior of the hollow plunger 23 and only after the ports 52 have passed under the ring 38. Thus the fluid flow tends to clear the ports 52 from the accumulation of any grit or foreign matter which may have collected there when the valve is in "off" position.

Moreover, the pressure on the packing ring 37 is always substantially balanced at the time when the ports 52 are passing across the packing 37 because pressure from the inlet passage not only reaches the channel legs of the packing ring 37, by seepage past the bushing 45 and spreader 31, but also reaches the inner annular surface of the inner packing ring leg through the ports 52 from the interior of the plunger as the ports 52 are passing across the packing ring 37. Accordingly, there is substantially no pressure tendency to disturb the packing ring 37 as the ports 52 pass under the same due to the balanced pressure just described.

The embodiment of the present invention described herein is a high pressure hydraulic valve, but it is to be understood that the same valve or valves embodying the same inventions and improvements may be used as well in low pressure lines. Moreover, it will be apparent to those skilled in the art how changes may be made in the valve construction to accommodate special conditions without departing from the scope of the present invention as defined in the claims appended hereto.

Accordingly, the present improvements provide a hydraulic valve avoiding the difficulties and solving the problems which have been previously encountered in hydraulic valve construction and operation; provide for ready valve inspection and repair when necessary; provide a valve which is relatively simple in construction and easily manufactured at a reasonable cost; and provide a valve capable of being opened or closed at any desired rate continuously at frequent intervals in lines where foreign matter may be contained in the water or other fluid passing through the valves without injuriously affecting the valve.

Referring to the packing rings 29, 37 and 44, the same have been described as being made preferably of leather. However, if desired, the same may be made of a molded material, which may be pressure sealed between the plunger and valve body, in the same manner as leather packing rings. In such event, the axial thickness of the flax packing rings 30, 36 and 43 may be reduced, and the axial length of the flange portions 32, 35 and 42 of the spacing spiders 31 and 40, may be correspondingly increased.

We claim:—

1. In fluid pressure valve construction, walls forming a valve body having a tubular opening therethrough comprising from end to end a passageway, an enlarged annular recess, a further enlarged annular inlet channel, a restricted annular neck, an enlarged annular outlet channel, and a restricted annular entering throat; there being inlet and outlet openings formed in said valve body communicating respectively with said inlet and outlet channels; bushings and packing means in said tubular opening comprising in order an annular bushing ring in said annular recess, a flexible channel-shaped packing ring in said annular recess abutting said bushing having its open side directed toward said inlet channel, a flax packing interposed between the annular flanges of said packing ring, an annular spacing spider spanning said inlet channel having one end abutting said flax packing, a flexible channel-shaped packing ring having its open side directed toward said inlet channel provided with a flax packing interposed between the annular flanges thereof located in said annular neck with the flax packing thereof abutting the other end of said spreader, an annular bushing held by said spreader within said neck between the inlet channel and said second named channel-shaped packing ring, a hardened metal ring abutting the other side of said last mentioned channel-shaped packing ring, a second annular spacing spider abutting said metal ring and spanning said outlet channel, a flexible channel-shaped packing ring disposed within said throat provided with a flax packing interposed between the annular flanges thereof and abutting the other end of said last mentioned spreader with its open side directed toward said outlet channel, an annular bushing abutting the other side of said last mentioned packing ring; a housing cap having a central opening therethrough secured to said valve body and provided with two annular shoulders, one abutting said last mentioned spreader and the second abutting said last mentioned bushing whereby said bushings, spreaders, packings and packing rings are positioned and clamped within said valve body; and a hollow annular plunger member closed at both ends slidably mounted within said bushings and provided with two series of ports spaced from each other formed in said annular walls and movable to positions establishing or cutting off communication between said inlet and outlet channels.

2. In high pressure valve construction, walls forming a valve body, spaced inlet and outlet passages formed in said valve body walls, a hollow plunger member closed at both ends slidably and removably mounted within said valve body; three channel-shaped pressure sealed packing rings interposed between the plunger and valve body, one between the inlet passage and one valve body end, a second between the outlet passage and the other valve body end, and the third between the inlet and outlet passages; said third packing ring having its open side directed toward the inlet passage, a plurality of ports including a multiple series of ports opposite said outlet passage formed in the plunger walls for establishing communication between the inlet and outlet passages through the hollow plunger when the plunger is moved to "on" position, said multiple series of ports traversing said third packing ring when the plunger is moved from "on" to "off" position and vice versa, and elongated tubular replaceable means protecting all ports that traverse said third packing ring from fluid flow in a direction from the exterior to the interior of the hollow plunger.

3. In high pressure valve construction, walls forming a valve body, spaced inlet and outlet passages formed in said valve body walls, a hollow plunger member closed at both ends slidably and removably mounted within said valve body; three channel-shaped pressure sealed packing rings interposed between the plunger and valve body, one between the inlet passage and one valve body end, a second between the outlet passage and the other valve body end, and the third between the inlet and outlet passages; said third packing ring having its open side directed toward the inlet passage, means locating and clamping said packing rings within said valve body in said positions, a plurality of ports including a multiple series of ports opposite said outlet passage formed in the plunger walls for establishing communication between the inlet and outlet passages through the hollow plunger when the plunger is moved to "on" position, said multiple series of ports traversing said third packing ring when the plunger is moved from "on" to "off" position and vice versa, and replaceable tubular means protecting all ports that traverse said third packing ring from fluid flow in a direction from the exterior to the interior of the hollow plunger.

4. In fluid pressure valve construction, walls forming a tubular valve body open from end to end, spaced inlet and outlet channels communicating respectively with inlet and outlet openings all formed in said valve body walls, a hollow plunger member closed at both ends slidably mounted within said valve body; three channel-shaped pressure sealed packing rings interposed between the plunger and valve body, one between the inlet channel and one valve body end, a second between the outlet channel and the other valve body end, and the third between the inlet and outlet channels; said third packing ring having its open side directed toward the inlet channel, a multiple series of ports formed in the plunger walls opposite said outlet channel and a single series of ports formed in the plunger walls opposite said inlet channel for establishing communication between the inlet and outlet channels through the hollow plunger when the plunger is moved to "on" position, said multiple series of ports traversing said third packing ring when the plunger is moved from "on" to "off" position and vice versa, and replaceable means protecting said multiple series of ports from fluid flow in a direction from the exterior to the interior of the hollow plunger.

5. In fluid pressure valve construction, a tubular valve body open at both ends, an inlet channel communicating with an inlet opening both formed in said valve body adjacent one end of the valve body, an outlet channel spaced from said inlet channel communicating with an outlet opening both formed in said valve body adjacent the other end of the valve body, a hollow plunger member closed at both ends slidably mounted through said valve body, a channel-shaped packing ring pressure seated between the plunger and valve body and located between the inlet channel and one end of the valve body, a second channel-shaped packing ring pressure seated between the plunger and valve body and located between the outlet channel and the other end of the valve body, and a third channel-shaped packing ring pressure seated between the plunger and valve body and located between the inlet and outlet channels, said third packing ring having its open side directed toward the inlet channel, a multiple series of ports formed in the plunger walls opposite said outlet channel and a single series of ports formed in the plunger walls opposite said inlet channel for establishing communication between the inlet and outlet channels through the hollow plunger when the plunger is moved to "on" position, said multiple series of ports traversing said third packing ring when the plunger is moved from "on" to "off" position and vice versa, and replaceable means protecting said multiple series of ports from fluid flow in a direction from the exterior to the interior of the hollow plunger.

6. In high pressure valve construction, walls forming a valve body, spaced inlet and outlet passages formed in said valve body walls, a hollow plunger member closed at both ends slidably and removably mounted within said valve body; channel-shaped pressure sealed packing rings interposed between the plunger and valve body, annular bushings mounted in said valve body slidably journalling said plunger, perforate spacing spider means interposed between adjacent packing rings, one of said packing rings being located between the inlet and outlet passages with its open side directed toward the inlet passage; means cooperatively positioning and clamping said bushings, rings and spiders within said valve body; two series of ports spaced from each other formed in the plunger walls for establishing communication between the inlet and outlet passages through the hollow plunger when the plunger is moved to "on" position, one of said series of ports being in multiple and passing across said last mentioned packing ring to the inlet side thereof when the plunger is moved from "on" to "off" position, and an annular ring always protecting said last mentioned multiple ports from fluid flow in a direction from the exterior to the interior of the hollow plunger whenever any of said ports are on the inlet side of said last mentioned packing ring.

7. In high pressure valve construction, walls forming a valve body provided with spaced inlet and outlet openings, a pressure sealed channel-shaped packing ring interposed between said openings with its open side directed toward said inlet opening, a hollow plunger member closed at both ends slidably mounted through said valve body against which said packing ring seals having two series of ports formed in its walls spaced from each other respectively opposite said inlet and outlet openings when the plunger is in "on" position for establishing communication therebetween, the series of ports opposite said outlet opening being in multiple and traversing said packing ring when the plunger is moved from "on" to "off" position and vice versa, and an elongated tubular member protecting said last mentioned multiple ports from fluid flow in a direction from the exterior to the interior of the hollow plunger.

8. In high pressure valve construction, walls forming a valve body provided with spaced inlet and outlet openings, a pressure sealed channel-shaped packing ring interposed between said openings with its open side directed toward said inlet opening, a hollow plunger member closed at both ends slidably mounted through said valve body against which said packing ring seals having two series of ports formed in its walls spaced from each other respectively opposite said inlet and outlet openings when the plunger is in "on" position for establishing communication therebetween, a replaceable wearing ring interposed between said packing and said outlet opening, means including a perforate spacing spider locating and clamping said sealing and wearing rings in said valve body, the series of ports opposite said outlet opening being in multiple and traversing said replaceable wearing ring and then said packing ring when the plunger is moved from "on" to "off" position, said wearing ring protecting said packing from fluid flow from the inside of the plunger to the outside thereof as the plunger is moved from "on" to "off" position, and elongated tubular means interposed between the packing ring and said inlet opening always protecting said last mentioned multiple ports from fluid flow from the inlet opening in a direction from the exterior to the interior of the hollow plunger whenever any of said ports are on the inlet side of said packing ring.

9. In high pressure valve construction, walls forming a valve body provided with spaced inlet and outlet openings, a pressure sealed channel-shaped packing ring interposed between said openings with its open side directed toward said inlet opening, a hollow plunger member closed at both ends slidably mounted through said valve body against which said packing ring seals having two series of ports formed in its walls spaced from each other respectively opposite said inlet and outlet openings when the plunger is in "on" position for establishing communication therebetween, the series of ports opposite said outlet opening being in multiple and traversing said packing ring when the plunger is moved to "off" position, an elongated tubular member protecting said last mentioned multiple ports from fluid flow from the inlet opening in a direction from the exterior to the interior of the hollow plunger whenever any of said ports are on the inlet side of said packing ring, and the ports being so constructed and arranged that the fluid pressure to which said packing ring is always subject from the inlet opening is substantially balanced by the fluid pressure from the interior of the plunger outward through said last mentioned series of ports as the same traverse said packing ring.

10. In high pressure valve construction, walls forming a valve body, spaced inlet and outlet passages formed in said valve body walls, a hollow plunger member closed at both ends slidably mounted in said body, channel-shaped pressure sealed packing rings interposed between the plunger and valve body, one of said packing rings being located between the inlet and outlet passages with its open side directed toward the inlet passage, two series of ports spaced from each other formed in the plunger walls for establishing communication between the inlet and outlet passages through the hollow plunger when the plunger is moved to "on" position, one of said series of ports being in multiple and traversing said last mentioned packing ring when the plunger is moved from "on" to "off" position and vice versa, means protecting said last mentioned multiple series of ports from fluid flow in a direction from the exterior to the interior of the hollow plunger, and the other series of ports always communicating directly with said inlet passage.

11. In high pressure valve construction, walls forming a valve body, spaced inlet and outlet passages formed in said valve body walls, a hollow plunger member closed at both ends slidably mounted in said body, a plurality of channel-shaped pressure sealed packing rings interposed between the plunger and valve body, a plurality of series of ports including a multiple series of ports spaced from each other formed in the plunger walls for establishing communication between the inlet and outlet passages through the hollow plunger when the plunger is moved to "on" position, said ports and packing rings being so constructed and arranged that as the plunger is moved from "on" to "off" position and vice versa only one packing ring is traversed by ports and then only by said multiple series of ports, and means protecting the multiple series of ports that traverse said last mentioned packing ring from fluid flow in a direction from the exterior to the interior of the hollow plunger.

NATHAN C. HUNT.
SAMUEL C. CHESSMAN.